No. 828,783. PATENTED AUG. 14, 1906.
J. A. STAPLES.
CULTIVATOR ATTACHMENT.
APPLICATION FILED MAY 19, 1906.

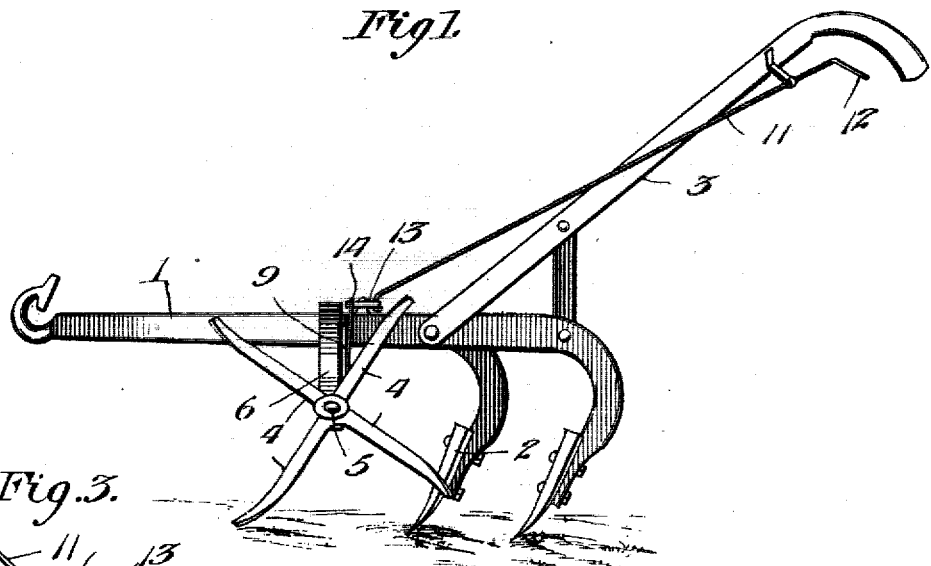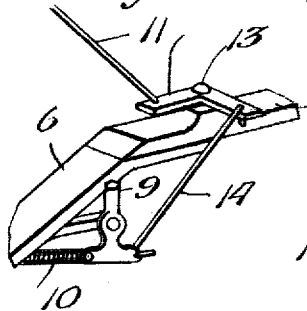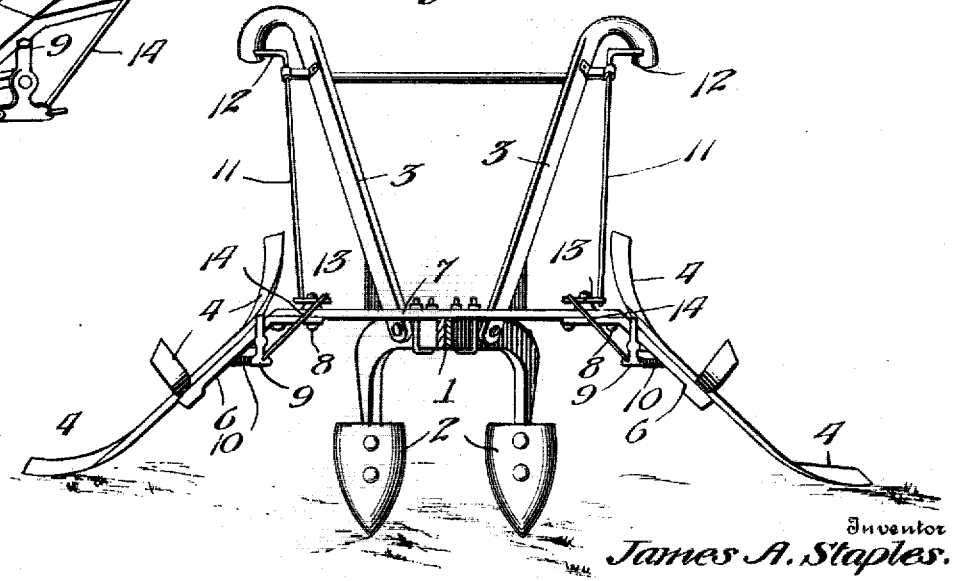

2 SHEETS—SHEET 2.

Witnesses
Phil E. Barnes
F. A. Elmore

Inventor
James A Staples

By Victor J. Evans
Attorney

UNITED STATES PATENT OFFICE.

JAMES A. STAPLES, OF MARLBORO, NEW YORK.

CULTIVATOR ATTACHMENT.

No. 828,783.  Specification of Letters Patent.  Patented Aug. 14, 1906.

Application filed May 19, 1905. Serial No. 261,229.

*To all whom it may concern:*

Be it known that I, JAMES A. STAPLES, a citizen of the United States of America, residing at Marlboro, in the county of Ulster and State of New York, have invented new and useful Improvements in Cultivator Attachments, of which the following is a specification.

My invention relates to cultivators, and has for its object to provide a device of the class mentioned adapted to cultivate between the rows of plants and at the same time to cultivate between the plants or hills of plants in the rows.

It is well known that in cultivating between rows of plants a strip of ground upon which the row is located remains uncultivated; that aside from the impossibility of preventing the growth of weeds in the row the ground remains unloosened and retards the growth of the roots. To overcome this undesirable feature, it has been considered necessary to so arrange the plants that they form rows extending at right angles to each other and to cultivate the field in both directions, thus involving a double expenditure of time and labor.

It is the principal object of my invention to provide an ordinary shovel-plow with wing-like members extending upon one or both sides and disposed and arranged to cultivate the ground in line with the rows.

It is a further object of my invention to provide means whereby when a plant is reached in the row the cultivating is temporarily discontinued and the plant left undisturbed. This I accomplish by providing the wing member with a plurality of blades and maintaining it to rotate, so that when a plant is reached the wing member is permitted to rotate, thus bringing into action upon the outer side of the plant another blade.

Figure 4:
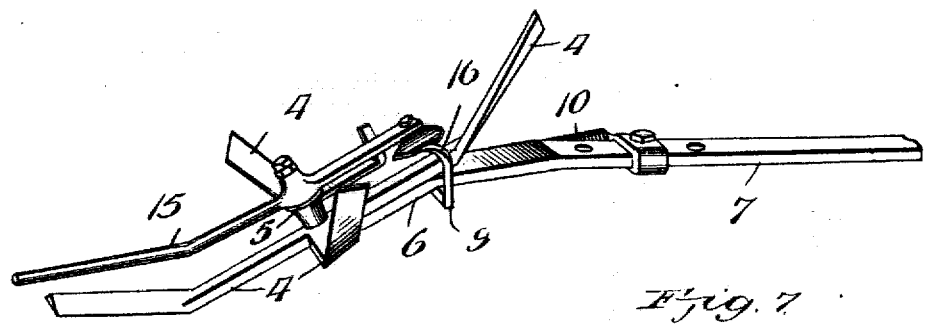
Figure 5:
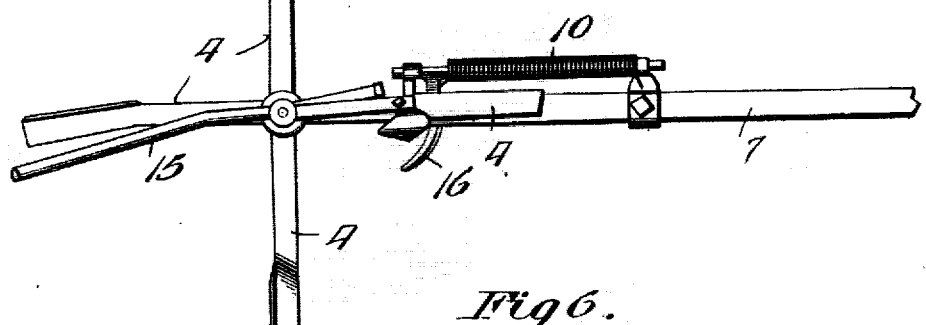
Figure 6:
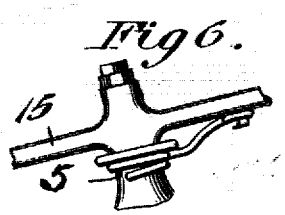

In the drawings, Figure 1 is a view in side elevation of a cultivator embodying my invention and showing the parts in operative position. Fig. 2 is a vertical sectional end view of a cultivator embodying my invention as seen from the front. Fig. 3 is a detail view of one form of lock for retaining the wing-blades in rigid and operative positions and a means for releasing them. Fig. 4 is a detail sectional view of another form of blade-lock with an automatic release. Fig. 5 is a detail view of the blade-lock and release shown in Fig. 4 and seen in side elevation. Fig. 6 is a detail view of the operating-spring.

Figure 7:
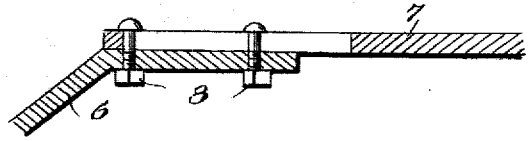

Fig. 7 is a detail sectional view of one of the brackets, showing the manner of adjustably connecting the same with the frame.

Referring to the drawings, it will be seen that I have illustrated my invention applied to a cultivator of ordinary form comprising a beam 1, carrying shovels 2 and equipped with handles 3, it being understood, of course, that the cultivator may be of any appropriate construction.

In accordance with my invention I equip the machine with auxiliary cultivating members, each comprising a plurality of radial arms or blades 4, designed to rotate about a common pivot 5, carried by a bracket 6, fixed to the frame of the cultivator, it being understood that there are a pair of the brackets arranged, respectively, on opposite sides of the beam 1. The brackets 6 are preferably disposed obliquely to the vertical, while the blades 4 are curved adjacent their ends, as shown, thus providing outturned ground-engaging portions which in practice act upon the ground between the plants in the rows. To permit the use of the cultivator in connection with rows of different widths, the brackets 6 are adjustably secured by a slot-and-bolt connection to a plate 7, rigidly secured to the beam 1. The brackets 6 may be secured at the approved adjustment by means of the bolts 8 or otherwise. The blades 4 are held in operative position by means of a lock 9, maintained movably in the path of the blades by a spring 10. To release the blades 4 and permit them to rotate, means are provided for displacing the lock 9 against the tension of the spring. This is accomplished manually by means of rods 11, having hand-grips 12 disposed adjacent the terminals of the handles 3. Each rod 11 connects at its lower end with one end of a bell-crank lever 13, to the other end of which is attached a link 14, forming connection with the adjacent lock 9.

Instead of or in conjunction with the aforesaid method of releasing the lock 9 a lock-releasing member 15, such as illustrated in Figs. 4, 5, and 6, may be pivotally secured upon the pivot 5 and by contacting at its lower end with stalks of the plants cause its upper end to ride up the inclined surface 16 of the lock 9, thereby automatically moving the lock against the tension of the spring 10.

The operation of my improved cultivator is as follows: With the elements assembled as shown in the drawings the curved end of the downwardly-extending blade 4 contacts with and cultivates the ground in the rows upon each side of the shovels 2. When a plant is reached, the lock 9 is manually released by the manipulation of the rod 11, and the frictional contact of the blade with the ground causes the blades to rotate about the pivot 5, thus temporarily discontinuing the operation of that blade and bringing into action the next succeeding blade, but upon the opposite or advance side of the plant. If the lock-release shown in Figs. 4, 5, and 6 is used, the pressure exerted by the plant-stalks upon the lower or outer end of the lock-releasing member 15 releases the lock, as before mentioned, permitting the same action of the blades as above described.

While I have shown the preferred form and manner of assembling the several parts of my invention, it is to be distinctly understood that I do not limit myself to the combination of all the parts shown, but reserve the right to use any of said parts alone or in combination with any of the other parts not shown and to make such other changes as may fall within the scope of my claims.

Having thus described my invention, what I claim is—

1. A cultivator arranged to cultivate between rows of plants and having a bracket extending laterally therefrom, a blade, upon the bracket disposed to cultivate the ground between the plants in the rows and means under control of the operator for removing the blade from a cultivating position at will.

2. A cultivator arranged to cultivate between rows of plants and having a bracket extending laterally therefrom, a plurality of blades secured to the bracket and adapted to cultivate between plants in the rows and so arranged that one blade is normally in cultivating position, and means for throwing one blade out of and another blade into cultivating position.

3. In a cultivator, a beam, shovels secured to the beam, a bracket extending laterally from the beam, a plurality of radially-arranged blades centrally pivoted to the bracket and so disposed that one blade is normally in cultivating position between the plants in the rows, means for securing the blades against rotation, and means for releasing the blades to permit them to rotate.

4. In a cultivator, a beam, shovels secured to the beam, a bracket extending laterally from the beam and disposed obliquely to a vertical, a plurality of radially-arranged blades curved at their outer ends and centrally pivoted upon the bracket and so disposed that the curved end of one blade is in cultivating position, means for retaining the blade in cultivating position, and means for permitting the rotation of the blades about the pivot.

5. In a cultivator, a plurality of radially-arranged blades having curved ends and mounted upon a central pivot and obliquely to a vertical, a lock disposed to contact with and hold one of said blades in cultivating position and means for releasing the lock.

6. In a cultivator, a beam, a plurality of radially-arranged blades having curved ends and rotatably mounted upon a central pivot carried by the beam and obliquely to a vertical, a spring-actuated lock disposed to contact with the blades and prevent their rotation and to hold one blade in cultivating position and means adjacent the hand of the operator for releasing the lock.

7. In a cultivator, a beam, a plurality of radially-arranged blades having curved ends and rotatably mounted upon a central pivot carried by the beam and obliquely to a vertical, a spring-actuated lock disposed to contact with and prevent rotation of the blades, a rod disposed convenient to the hand of the operator and means connecting the rod and the lock whereby a movement of the rod releases the lock.

JAMES A. STAPLES.

Witnesses:
 J. JAY ENNIST,
 JAMES F. BENNETT.